Oct. 29, 1963 J. W. HUMPHREYS 3,108,581
CRANKCASE PRESSURE CONTROLLER
Filed Jan. 22, 1962 3 Sheets-Sheet 1

INVENTOR.
JOHN W. HUMPHREYS
BY
ATTORNEYS

Oct. 29, 1963 J. W. HUMPHREYS 3,108,581
CRANKCASE PRESSURE CONTROLLER
Filed Jan. 22, 1962 3 Sheets-Sheet 3

INVENTOR.
JOHN W. HUMPHREYS
BY
ATTORNEYS

United States Patent Office 3,108,581
Patented Oct. 29, 1963

3,108,581
CRANKCASE PRESSURE CONTROLLER
John W. Humphreys, Muskegon, Mich., assignor to Johnson Products Inc., Muskegon, Mich., a corporation of Michigan
Filed Jan. 22, 1962, Ser. No. 167,562
18 Claims. (Cl. 123—119)

This invention relates to internal combustion engines, and more particularly to a controlled exhausting system for an engine crankcase.

Control of noxious, gaseous fumes and vapors from internal combustion engines, especially in smog-prone areas, has stimulated the development of systems to conduct crankcase vapors to the engine air intake system. Flow systems developed heretofore are controlled by the intake manifold vacuum which regulates the flow of fumes from the crankcase. Such vacuum controlled flow systems inherently involve control problems since the desired rate of vapor flow must vary roughly inversely with the amount of manifold vacuum. This is because maximum vacuum occurs at periods of low engine blow-by, and minimum vacuum occurs at periods of maximum blow-by. At full load operation of the engine, intake vacuum is practically nil, and consequently it is almost impossible to draw all of the crankcase gases through the regulator into the manifold, especially if the engine is somewhat worn so that blow-by in the cylinders is large and vacuum in the manifold is especially low. Further, at all other loads, it is necessary to draw excess air through the flow system to compensate for extra blow-by when the engine becomes worn. With these manifold-vacuum responsive systems, therefore, the crankcase must be vented to the atmosphere to allow exit of excess gases under maximum blow-by low vacuum conditions, and to allow excess air entry under high-vacuum, low-blow-by conditions.

Furthermore, with vacuum regulation systems, each flow regulator device must be matched to the particular engine displacement to provide proper interrelated action between the independently varying manifold vacuum and blow-by volume. Moreover, vacuum controlled regulators require small orifices due to the reverse regulation involved, and small orifices are prone to plugging by carbon deposits.

It is the primary object of this invention to provide an engine crankcase regulator that is controlled completely independently of the manifold vacuum, and is extremely sensitive to positive crankcase vapor pressure to constantly and dependably exhaust crankcase vapors to the manifold, no matter what the engine load. The regulator, instead of being actuated by a constantly varying negative gaseous pressure (i.e. vacuum) is actuated by the positive pressure in the crankcase which varies only slightly.

Another object of this invention is to provide a crankcase exhausting system in which the crankcase is completely sealed to the atmosphere to prevent any undesirable exhausting of noxious vapors therefrom into the atmosphere. This is possible since the novel regulator is responsive to any positive pressure increase in the crankcase to exhaust it to the air intake without depending upon a favorable manifold vacuum condition. The novel regulator causes the crankcase pressure to constantly seek a norm at atmospheric pressure, thereby removing any tendency for blow-by gases from seeping out to the atmosphere. The regulator in the novel system further needs no special calibration for different size engines, since it accommodates any engine no matter what the displacement or age thereof. It is simple and inexpensive in construction. It neither utilizes nor needs any spring elements. It does not require excess air to be passed into the engine through the crankcase. It possesses no small orifices to plug and disrupt its operation.

These and other objects of this invention will be apparent upon studying the following specification in conjunction with the drawings in which.

Basically, the invention comprises an internal combustion engine having a crankcase sealed to the atmosphere, a closed gaseous flow conduit from the sealed crankcase to the engine air intake system, and a flow regulator in the flow conduit, responsive to a slight, positive crankcase pressure above atmospheric pressure to enable flow through the conduit to dissipate the vapor pressure increase from the pressurized crankcase to the vacuum manifold.

The regulator includes a valving means unresponsive to intake manifold vacuum to prevent any response of the regulator to vacuum, and including a pair of counteracting surfaces exposed to and responsive respectively to atmospheric pressure and crankcase pressure to periodically expose the crankcase to the manifold vacuum.

The invention also comprises the method of removing noxious vapors from an internal combustion engine crankcase comprising the steps of sealing the crankcase of the engine with respect to the atmosphere, operating the engine and building up vapor pressure in the crankcase, constantly bleeding off vapors from the crankcase when the vapor pressure becomes greater than atmospheric pressure, and conducting the bleeded vapors into the air intake system of the engine.

Figure 1:
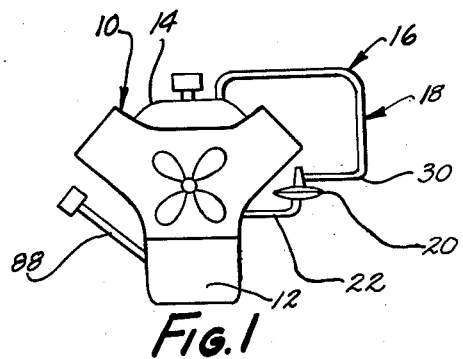
FIG. 1 is an elevational view of an engine and the novel crankcase ventilation system.

Referring now to FIG. 1, the combination there shown includes a typical internal combustion engine 10 having a crankcase 12 and an air intake system including an intake manifold 14. Connected between the crankcase and the intake manifold is the novel ventilation system 16 including conduit 18 and regulator 20.

Figure 2:
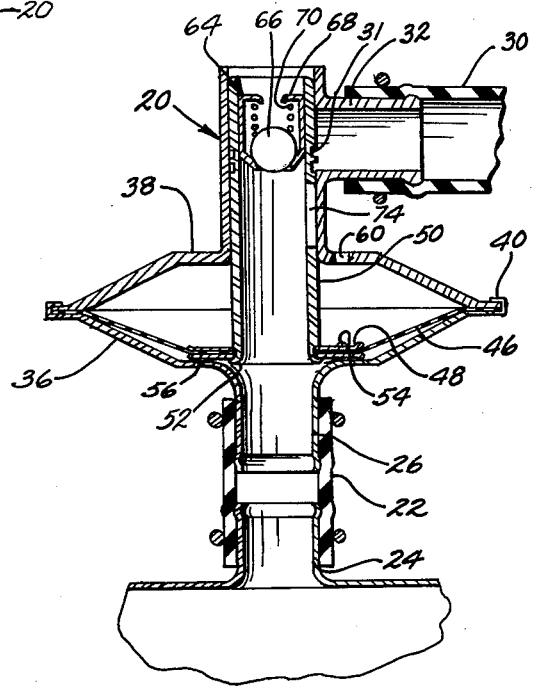
FIG. 2 is a sectional view of one form of the novel regulator in the flow system of this invention.

The conduit 18 may include a lower section 22 of rubber hose or the like attached to an outlet 24 on the crankcase (e.g. the conventional breather tube) and to an inlet 26 on the regulator as illustrated in FIG. 2. Suitable clamps are utilized to hold the hose in place. The conduit may also include an upper section 30 or rubber hose or the like to be clamped to the outlet 32 on the regulator and to the intake manifold on its upper end.

The novel regulator 20 in the form illustrated in FIG. 2, includes a lower housing section 36 and an upper housing section 38. Lower housing section 36 is formed of a dish-shaped base attached at its periphery to a facing dish-shaped top. The attachment may be made by crimping the peripheral edge 40 of one around the other as illustrated in FIG. 2, or by bolts or other equivalent means. The top may be integral with the upper housing section 38. Within the lower housing section is mounted a pressure-responsive member, preferably an annular diaphragm 46 mounted at its outer periphery to the lower housing section, and at its inner periphery between a pair of retaining flanges 48. The flanges are secured to cylindrical sliding valve member 50 by curling the edge 52 thereover. On the lower and upper surfaces of the flange members 48 are dimples 54 and 56 (reverse) to prevent a positive seal from occurring between the flange members and the housing in the extreme positions of the diaphragm. In the upper dish is a vent 60 to the atmosphere such that diaphragm 46 is responsive between atmospheric pressure on its upper side and crankcase pressure on its lower side.

Hollow cylindrical valving member 50 includes an open lower end and an upper end closed by a safety blow off valve 64. The safety valve may comprise a suitable ball 66, ball retainer 68, and biasing spring 70, and prevents possible engine damage if the ordinary valve will not open. This safety valve structure may be of various constructions, for example, a press-fitted pressure disc may be substituted for the preferred spring biased, returning ball valve. Cylindrical valving member 50 is slidably movable in the upper housing section and includes a side port 74 which can be aligned partially or entirely with outlet 32 in the regulator housing to communicate with the intake manifold.

A plurality of annular grooves 31 are provided in the cylindrical valving member 50 to equalize the pressure therearound and prevent it from drawing more tightly against the outlet wall. This assures reliable shifting of the valving member.

Figure 6:
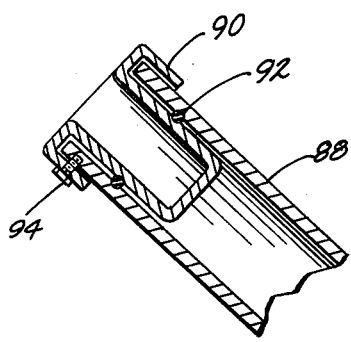
FIG. 6 is a fragmentary, sectional view of a suitable crankcase filler spout sealing plug useable with the novel apparatus.

The crankcase filler tube 88 of a conventional engine may be sealingly closed to seal the crankcase from the atmosphere as by inserting a plug 90 which may be a stamping or the like, and which may include a suitable O-ring seal 92 and retaining set screw 94, if necessary. The usual dip stick tube may be sealed by the same type of cap as in FIG. 6 but smaller in dimension, of course. The dip stick may also be revised to be a seal when inserted in the tube. Many other equivalent seals may be utilized for these elements since these are only illustrative. In fact, the regulator may be attached to the filler tube instead of the breather tube as explained, or the crankcase could be specially manufactured to include the regulator and otherwise be sealed to the atmosphere.

*Operation*

The crankcase 12 of internal combustion engine 10 used in combination with the crankcase vapor flow system is first sealed to the atmosphere so that vapor pressure increases therein caused by blow-by and the like will not escape to the atmosphere. When a small pressure differential occurs in the crankcase and thus in lower conduit 22, diaphragm 46 is shifted from the position illustrated in FIG. 2 to the position illustrated in FIG. 3. Extensive test runs have shown that a positive pressure of about 1 ounce lifts the diaphragm quickly and effectively. This shifts the valving member 50 upwardly to align at least part of lateral port 74 with housing outlet port 32 to the intake manifold. The pressure differential between the crankcase pressure and the manifold vacuum causes the crankcase vapors and fumes to rapidly flow directly through the valving member. (The term positive pressure when used herein normally means substantially superatmospheric pressure.) As soon as the vacuum in the intake manifold lowers the pressure in the crankcase below atmospheric pressure, air entering at vent 60 forces the diaphragm 46 downwardly again to close the valve 74 until the crankcase pressure again builds up to a value above atmospheric pressure. Thus, it will be realized that the valve constantly adjusts toward open and closed positions to maintain near atmospheric pressure in the crankcase. The regulator is thus responsive only to the condition to be alleviated. Its movement is not regulated by the greatly changing manifold vacuum, but it merely utilizes the vacuum to help exhaust the vapors when the pressure in the crankcase actuates the regulator. It should be completely understood that when a pressure responsive valve having a differential pressure thereacross opens, the subsequent gaseous flow occurring in efforts of the system to equalize the pressure, may momentarily cause sub-atmospheric pressure upstream of the valve if a vacuum condition prevails downstream of the valve, and a pressure equal to or greater than atmospheric occurs upstream of the valve. In the present invention, therefore, after the valve opens, the manifold vacuum condition may actually cause a momentary, sub-atmospheric condition upstream of the valve after the crankcase vapors rush through and just as the valve is about to close. This sub-atmospheric condition will ordinarily be just slightly below atmospheric since as soon as this occurs, the valve closes and prevents the actuator from being responsive to the varying manifold vacuum. The significant controlling movement of the diaphragm in this invention is therefore in response to the amount of crankcase pressure, as can be readily appreciated. The actuator does not open in response to manifold vacuum, but opens only when the crankcase pressure reaches a predetermined maximum. Although the manifold vacuum increases and decreases during engine operation, these manifold pressure fluctuations in essence have no control or effect on the actuator on the opposite side of the closed valve since the negative pressure only serves as a "sucking tool," so to speak, when the crankcase pressure actuates the valve. The crankcase pressure variations of pressure build-up and subsequent exhaust do therefore control the device. Also, it should be understood that, as the valve opens and gases rush past the valve, (especially in the modification in FIGS. 7 and 8) the dynamic conditions of the flowing gases caused by the interaction of the crankcase pressure and manifold vacuum trying to establish an equilibrium pressure, may cause some small effect on the valve member itself, (e.g. butterfly valve 236 in FIG. 8). However, the significant valve movement is again in response to the actuator diaphragm as controlled by the crankcase pressure. Accordingly, when the actuator is described herein as "unresponsive to intake pressure" or "unresponsive to vacuum conditions in the manifold," these terms should be interpreted in the light of the above inherent operational factors. In other words, although the vacuum in the intake manifold momentarily lowers the pressure on the crankcase side of the valve, and even perhaps in the crankcase, below atmospheric in accordance with this invention, the actuator of the valve is considered responsive to crankcase pressure and non-responsive to manifold or intake pressure. The device is self-cleaning in nature as any deposits are washed out by the gases due to the direct flow and lack of small flow orifices.

If the valving member should stick for any particular reason after a long period of use, the safety valve 64 will allow any excess pressure building up in the crankcase to be vented. This prevents any possible damage to any of the engine parts by excess pressure with possible failure of the regulator.

*Modification*

Figure 3:
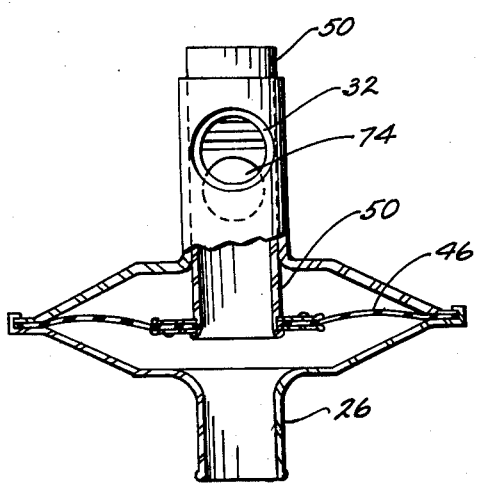
FIG. 3 is a partially sectioned view of the regulator in FIG. 2 in the venting position.
Figure 4:
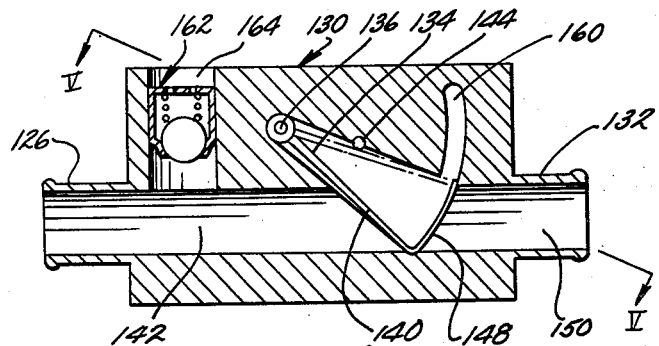
FIG. 4 is an elevational view of a second form of the novel regulator of this invention.
Figure 5:
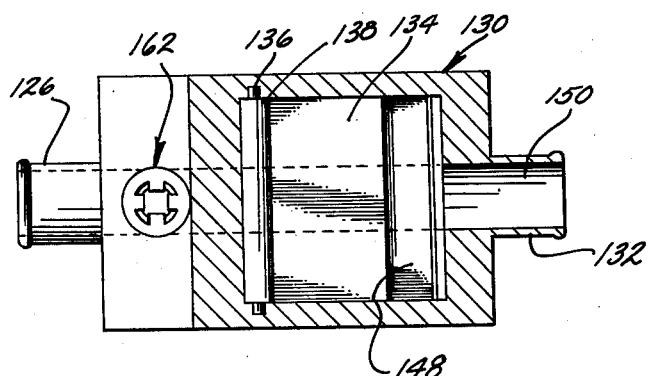
FIG. 5 is a partially sectioned, plan view of the second form of the regulator, taken on plane V—V of FIG. 4.

Instead of the form of the invention illustrated in FIGS. 1 through 3, within the broadest aspect of this invention, the form of the invention illustrated in FIGS. 4 and 5 may be utilized. This form includes an inlet 126 from the crankcase integral with the body 130 of the regulator, and an integral outlet 132 to the intake manifold. In this form of the invention, the valving member 134 is pivotally mounted on pin 136 through collar 138. It includes a first leg 140 having one surface responsive to the crankcase pressure through the conduit portion 142 and a second, opposite, counteracting surface responsive to atmospheric pressure of air through to vent 144 to the atmosphere. The valving member includes a second leg 148 extending across the conduit section 150 to prevent the responsive leg 140 of the valve from being exposed to the intake manifold vacuum. It will be noted that the surface area of leg 148 is not affected by pressure thereon since all portions of it are substantially perpendicular to any imaginary plane drawn from the axis of pin 136 and intersecting leg 148.

Thus, as crankcase pressure increases above atmospheric, the valve is lifted and leg 148 passes into recess 160 and allows the intake manifold vacuum to draw the excess vapors through the regulator. As soon as the pressure on the left side of leg 140 becomes less than the atmospheric pressure through vent 144, the valve is again closed until the next pressure increase occurs. A safety valve 162 is inserted in passageway 164 to provide an outlet for pressurized gases in case valve 134 should stick in the closed position.

Second Modification

Figure 7:
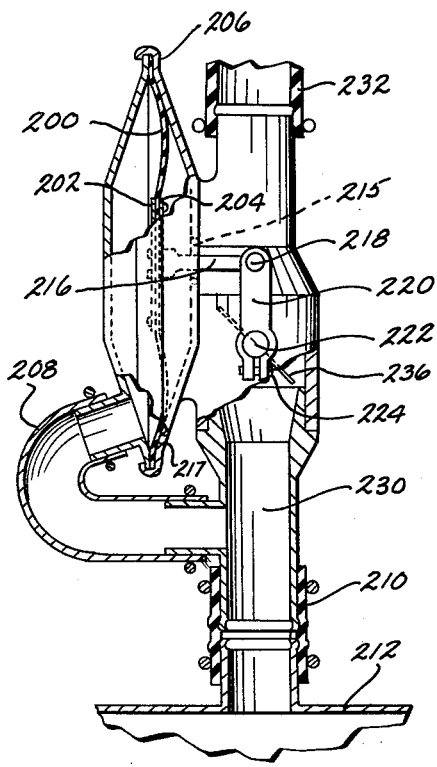
FIG. 7 is an elevational, fragmentary view of another modification shown partially broken away.
Figure 8:
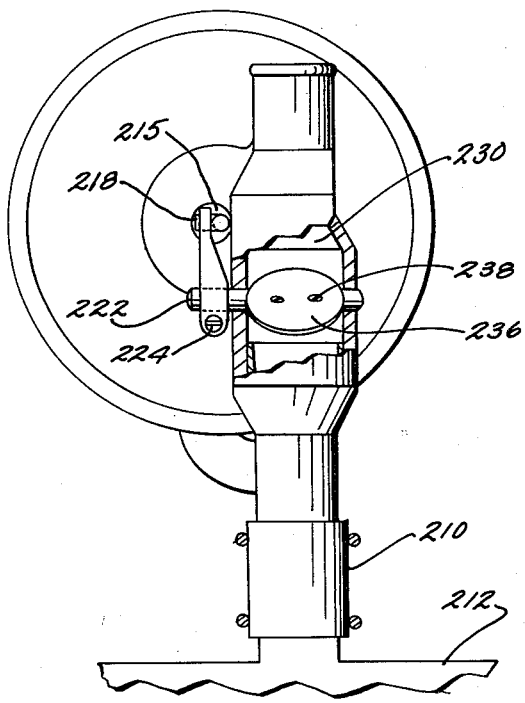
FIG. 8 is a front elevational view of the modification in FIG. 7.

Another form of the invention is shown in FIGS. 7 and 8. The pressure responsive diaphragm 200, attached at its center between plates 202 and 204 and at its peripheral edge to housing 206, is located in communication with a lead-off duct 208 from the main duct or hose 210 leading from the crankcase 212. A connecting link 216 is attached to plates 202 and 204 at one end and has a lateral cylindrical pin 218 at the other end. Link 216 extends into flow passageway 230 through an enlarged opening 215 to provide a floating action. Opening 215 also allows access of atmospheric air to the back side of the diaphragm. A supplementary access opening 217 may also be provided. Pin 218 pivotally interfits in a cylindrical recess in the end of link 220, the other end of which is fixedly attached around shaft 222 by a conventional bifurcated clamping means including tightening screw 224. Shaft 222 extends laterally across the flow passageway 230 between the crankcase conduit or duct 210 and the duct 232 to the intake manifold. Shaft 222 is pivotally mounted on both sides of the passageway to enable butterfly valve disc 236 affixed to shaft 222 as by screws 238 to open and close the passageway.

In operation, since the gaseous pressure in the crankcase exerted through duct 208 on the front of the diaphragm exceeds the atmospheric pressure on the back side of the vacuum, the diaphragm shifts to the right (FIG. 7) and shifts link 216, and pin 218. Link 220 then is rotated to rotate shaft 222 and open valve 236. This allows the vacuum in the intake manifold (i.e. the pressure differential between the crankcase and the manifold) to draw the noxious vapors from the crankcase into the manifold for combustion. The diaphragm-actuated valve seeks a balance position with the proper opening to accommodate the engine blow-by conditions. Since conduit 208 defines a dead-end passageway having no outlet, the air in conduit 208 and the isolated communicant chamber adjacent diaphragm 200 is therefore inherently stagnant and forms a type of air-piston. Accordingly, the noxious gases including acids do not flow past the diaphragm in this form of the invention and as a result, the diaphragm has an exceptionally long life and the entire diaphragm actuator is kept from being fouled up by deposits from the gases. Further, the valve is self washing by the vapor flow to prevent any substantial deposition of carbon thereon. As in the other forms of the invention, the valve is not significantly affected by the vacuum conditions in the manifold, i.e. the pressure differential across the valve. Rather, it merely allows flow from the crankcase to the manifold when shifted in response to the pressure differential between the atmosphere and the crankcase.

The inventive regulator in the combination described above may be modified in various ways within the principles of the invention taught. Obvious modifications are deemed to be part of this invention which is to be limited only by the appended claims and the reasonably equivalent structures to those defined therein.

I claim:
1. An engine assembly comprising: an internal combustion engine including a crankcase and intake manifold means; said crankcase being sealed to the atmosphere; conduit means extending between said crankcase and said manifold; a flow regulator in said conduit means; said regulator being unresponsive to vacuum conditions in said manifold, and being responsive solely to gaseous pressure in said crankcase over a standard pressure to open and exhaust said gases to said monifold and to close again after said exhaust.

2. An engine assembly comprising: an internal combustion engine including a crankcase and intake manifold means; said crankcase being sealed to the atmosphere; conduit means extending from said sealed crankcase to said intake manifold means; regulator means for said conduit including a valving means for vapor flow from said crankcase to said manifold; a pressure responsive element in said regulator responsive to the differential pressure between said crankcase pressure and the atmosphere and unresponsive to intake pressure; said element causing said valving member to open and allow vapor flow to said manifold upon an increase in crankcase pressure greater than atmospheric pressure and causing said valving member to close upon a decrease in crankcase pressure below atmospheric pressure, whereby said vapor flow is regulated by the positive pressure in said crankcase.

3. A crankcase ventilation system for an internal combustion engine having a sealed crankcase comprising: conduit means adapted to extend between the sealed crankcase and the air intake means of an engine; a positive pressure responsive flow regulator means in said conduit means; said regulator means having a pressure responsive surface area in communication with said crankcase and normally isolated from said intake means and a counter-acting surface area communicating with the atmosphere; said regulator means including a valving means normally closed, and being openable in response to an increased pressure in said crankcase over atmospheric pressure to exhaust said crankcase temporarily to said manifold means.

4. A crankcase exhaust regulator adapted to control the flow of vapors through a conduit means extending between the sealed crankcase and the intake manifold means of an internal combustion engine, comprising: a housing; shiftable flow control valving means in said housing; said flow control valving means having a responsive surface exposed to atmospheric pressure and having an opposing responsive surface exposed to crankcase pressure; said flow control valving means being unresponsive to manifold vacuum conditions, said regulator allowing vapor flow from said crankcase to said manifold when the crankcase pressure exceeds the atmospheric pressure and stops vapor flow when the atmospheric pressure exceeds the crankcase pressure.

5. The regulator in claim 4 wherein a blow-out safety valve is mounted in said housing between the portion exposed to crankcase pressure and the atmosphere whereby potential engine damage due to failure of said regulator is eliminated.

6. A crankcase exhaust regulator adapted to control the flow of vapor through a conduit extending between the sealed crankcase and the intake manifold means of an internal combustion engine, comprising: a housing; a shiftable valving means in said housing; said valving means being operated by a control means having one surface responsive to standard pressure and another surface responsive to crankcase pressure but unresponsive to intake pressure; said valving means being opened by said control means when said crankcase pressure is greater than said standard pressure and being closed when said standard pressure is greater than said crankcase pressure.

7. A crankcase exhaust regulator means adapted for installation with a conduit extending between the sealed crankcase and the intake manifold means of an internal combustion engine comprising: a housing; a cylindrical chamber in said housing; a reciprocable valving member in said chamber and having one end protruding therefrom, said valving member being hollow and having one open end at said protruding end adapted to communicate with said manifold; a lateral passageway through said housing, communicating with the side of said chamber and adapted to communicate with said manifold; a lateral port in said valving member adapted to communicate with said lateral passageway in one position of said valving member; an annular diaphragm secured around the protruding end of said valving member and secured at its outer periphery to said housing; said diaphragm being subjected to atmospheric pressure on one side and crankcase pressure on the opposite side to shift said valving member into a flow position upon an increase in crankcase pressure over atmospheric pressure and to shift said valving member out of said flow position upon a decrease in crankcase pressure below atmospheric pressure.

8. The regulator means in claim 7 wherein said hollow valving member has a pressure responsive blow-out valve in the end opposite said one open end to enable large gaseous pressures in said crankcase to be dissipated.

9. A crankcase ventilation regulator means adapted for installation with a conduit extending between the sealed crankcase and the intake manifold means of an internal combustion engine comprising: flow control valve means; shiftable positive pressure responsive means communicating with said crankcase and normally isolated from said intake manifold on one side and with the atmosphere on the other; and said pressure responsive means being associated with said valve means to open said valve means upon an increase in crankcase pressure over atmospheric pressure to exhaust said crankcase to said intake means, and to close upon a decrease in crankcase pressure after said exhaust.

10. A crankcase exhaust regulator adapted to control the flow of vapors through a conduit means extending between the sealed crankcase and the intake manifold means of an internal combustion engine, comprising: a housing; a passageway through said housing adapted to provide flow communication between the crankcase and the manifold means; a shifting pressure responsive valving means in said passageway; a first portion of said valving means having one side exposed to crankcase pressure; an atmospheric vent in said housing communicating with the opposite side of said first portion to expose said opposite side to atmospheric pressure; said valving means having a surface area between said opposite side and the part of said passageway communicating with said manifold, and preventing exposure of said opposite side to manifold vacuum; said second portion being unresponsive to pressures thereon; and said first portion being responsive to pressure differentials between said atmospheric pressure and said crankcase pressure to open if the latter is greater and to close if the former is greater.

11. A crankcase exhaust regulator adapted to control the flow of vapors through a conduit means extending between the sealed crankcase and the intake manifold means of an internal combustion engine, comprising: a housing; a passageway through said housing adapted to provide flow communication between the crankcase and the manifold means; a pivotal flap extending across said passageway with one surface exposed to crankcase pressure; a second surface of said flap opposite said one surface being exposed to atmospheric pressure to enable said flap to pivot and open said passageway when crankcase pressure is greater than atmospheric pressure, and to close said passageway when atmospheric pressure is greater than crankcase pressure; and a third surface on said flap normally across said passageway and exposed to manifold vacuum and preventing said second surface from exposure to manifold vacuum; and said third surface being arranged so that the portions thereof are substantially perpendicular to any plane extending through the pivotal axis of said flap and intersecting said surface.

12. A crankcase exhaust regulator adapted to control the flow of vapors through a conduit means extending between the sealed crankcase and the intake manifold means of an internal combustion engine, comprising: a housing; a passageway through said housing adapted to provide flow communication between the crankcase and the manifold means; a valve in said passageway and being unresponsive to gaseous pressures; a pressure responsive means outside of said passageway; one side of said element being subjected to atmospheric pressure and the other side of said element being subjected to crankcase pressure; linkage means between said element and said valve whereby an increase in crankcase pressure over atmospheric shifts said element, and said linkage to open said valve and allow flow from said crankcase to said manifold.

13. A crankcase exhaust regulator adapted to control the flow of vapors through a conduit means extending between the sealed crankcase and the intake manifold means of an internal combustion engine, comprising: a housing; a passageway through said housing adapted to provide flow communication between the crankcase and the manifold means; a butterfly valve in said passageway; a shaft mounting said valve and extending out of said passageway; a linkage connected to said extending end; a pressure responsive element connected to said linkage and adapted to rotate said shaft and move said valve; means at least substantially enclosing said pressure responsive element; conduit means between one side of said pressure responsive means and the portion of said passageway adapted to communicate with the crankcase; and the opposite side of said pressure responsive element being adapted to communicate with the atmosphere, whereby the pressure of said crankcase over atmospheric can open said valve and allow flow of noxious vapors from said crankcase to said manifold.

14. An engine assembly comprising: an internal combustion engine including a crankcase and intake manifold means; said crankcase being sealed to the atmosphere; conduit means extending between said crankcase and said manifold; a flow regulator in said conduit means including a valve in said conduit means, and a pressure responsive member operatively connected to said valve and having one side exposed to crankcase pressure and the opposite side exposed to the atmosphere, and adapted to shift said valve, said pressure responsive member being unresponsive to intake pressure.

15. A crankcase ventilation system for an internal combustion engine comprising: conduit means adapted to extend between the crankcase and the air intake means of an engine; a flow valve in said conduit means; and a pressure responsive member having one side in communication with the end of said conduit means adapted to be connected to the engine crankcase, and having the other side in communication with the atmosphere; and said pressure responsive member being operatively connected to said valve for shifting said valve said pressure responsive member being unresponsive to the air intake means of the engine.

16. A crankcase exhaust ventilator adapted to control the flow of vapor through a conduit extending between the sealed crankcase and the intake manifold means of an internal combustion engine, comprising: a housing having a conduit flow passage therethrough with connecting means to the manifold and connection means to the crankcase; a valve means in said passage; a pressure responsive valve actuator operably linked to said valve means; said pressure responsive valve actuator being vented to the atmosphere only on one side; dead-end conduit means to the other side of said actuator, extending from the portion of the conduit flow passage between the valve means and the connecting means for the crankcase; and said dead-end conduit means forming a substantially stagnant gaseous chamber during operating conditions.

17. A crankcase exhaust ventilator adapted to control the flow of vapor through a conduit extending between the sealed crankcase and the intake manifold means of an internal combustion engine, comprising: a housing having a conduit flow passage therethrough with connecting means to the manifold and connecting means to the crankcase to allow intermittent flow of gases from the crankcase to the manifold; a dead-end passageway from said flow passage to define a relatively stagnant air piston chamber; a self-washing butterfly valve in said flow passage downstream from said passageway; a pressure responsive valve actuator at the dead-end of said passageway and having one side exposed to the air piston chamber; the other side of said actuator being vented to the atmosphere so that said actuator is controlled by the crankcase pressure in relation to atmospheric pressure; operable connecting means between said actuator and said butterfly valve to control the opening of the valve responsive to crankcase pressure conditions and unresponsive to intake manifold fluctuations; and said actuator being isolated from the flow of crankcase vapors through said flow passage to prevent deposits on said actuator.

18. An internal combustion engine crankcase ventilation system closed to the atmosphere comprising: a sealed crankcase; intake manifold means; air tight conduit means extending between said sealed crankcase and manifold means; a gaseous flow regulator in said conduit means including a valve responsive to open intermittently and smoothly according to crankcase pressure build-up to allow intermittent momentary exhausting of crankcase vapors to said manifold means by the negative pressure therein; a pressure responsive valve actuator operably connected to the valve, located on a dead-end passage upstream of said valve, actuated to open by pressure build-up in the sealed crankcase, and isolated in its dead-end passage from the vapor flow when said valve opens, to remain free of deposits and dynamic flow variations.

References Cited in the file of this patent
UNITED STATES PATENTS

| | | |
|---|---|---|
| 675,704 | Anderson et al. | June 4, 1901 |
| 2,775,960 | Druzynski | Jan. 1, 1957 |